UNITED STATES PATENT OFFICE

1,951,815

AZO-DYESTUFFS INSOLUBLE IN WATER AND FIBER DYED THEREWITH

Karl Zahn and Kurt Schimmelschmidt, Frankfort-on-the-Main, Germany, assignors to General Aniline Works, Inc., New York, N. Y., a corporation of Delaware No Drawing. Application June 14, 1932, Serial No. 617,261. In Germany June 24, 1931

10 Claims. (Cl. 260—95)

The present invention relates to new azo-dyestuffs insoluble in water and to fiber dyed therewith; more particularly it relates to compounds of the following general formula:

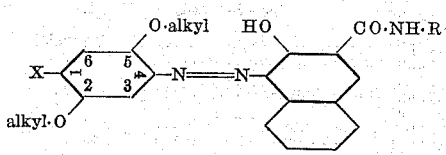

wherein X stands for a radical of the benzene series and R for a radical of the aromatic series.

We have found that new azo-dyestuffs of good fastness properties are obtainable by coupling diazo compounds of 4-amino-2.5-dialkoxy-diphenyl or of substitution products thereof with 2.3-hydroxynaphthoic acid arylides, either in substance, on the fiber or on a substratum adapted for the production of lakes, only such components being used as do not contain groups which would render the dyestuffs soluble in water and alkalies, such as the sulfonic acid, the carboxylic acid or the hydroxy group.

The shades of the dyestuffs obtainable according to the present process vary from Bordeaux to violet to blue. The new dyestuffs are distinguished by a much better fastness to light than the dyestuffs prepared from 4-amino-diphenyl.

The following examples serve to ilustrate the invention, but they are not intended to limit it thereto:

(1) 50 grams of well boiled cotton yarn are treated for half-an-hour with one liter of the grounding liquor, squeezed or hydro-extracted; the wet material is then dyed in the developing bath. Thereupon, the material is rinsed, soaped in a boiling soap bath and dried.

(a) *Grounding liquor:*—
2.7 grams of 2'3'-hydroxynaphthoyl-1-amino-4-chloro-2.5-dimethoxy-benzene are dissolved at boiling temperature with
10 cc. of Turkey red oil of 50% strength and
6.4 cc. of caustic soda solution of 34° Bé. To the boiled solution, there are added
2.7 cc. of formaldehyde solution of 30% strength. The whole is then made up with cold water to 1 liter.

(b) *Developing bath:*—
2.29 grams of 4-amino-2.5-dimethoxy-diphenyl are diazotized, while cooling, with
3.1 cc. of hydrochloric acid of 20° Bé and
8 cc. of sodium nitrite solution of 10% strength. The diazo solution is neutralized by means of
1.5 grams of dissolved sodium bicarbonate and, after addition of about 25 to 30 grams of sodium chloride, the whole is made up with water to 1 liter.

A vivid, clear violet dyeing of good fastness properties, especially of a very good fastness to light, is obtained.

The dyestuff has the following formula:

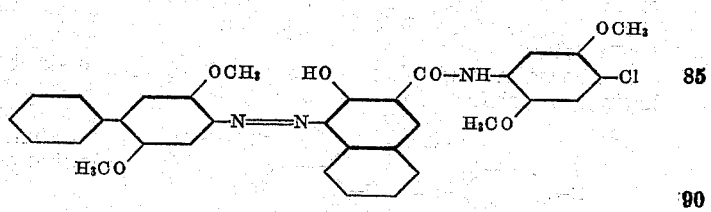

(2) A diazo solution prepared in the usual manner from 22.9 parts by weight of 4-amino-2.5-dimethoxy-diphenyl is run into an aqueous suspension of 35.7 parts by weight of 2'3'-hydroxynaphthoyl-1-amino-2.5-dimethoxy-4-chlorobenzene, prepared by dissolving the said arylide in an alcoholic caustic soda solution, diluting with water and neutralizing with acetic acid. When the coupling is finished, the dyestuff which separates in the form of violet flakes, is filtered with suction and washed until neutral.

Dyestuffs of similar fastness properties are obtainable by replacing the diazo compound, used in the above examples, by corresponding substitution products. Instead of the coupling component mentioned in the above examples other arylides of 2.3-hydroxynaphthoic acid may be used.

The following table indicates a number of further combinations obtainable according to the present invention but is not intended to limit the invention to the dyestuffs mentioned therein:

|  | Diazotizing component | Coupling component | Tints |
|---|---|---|---|
| (1) | 4-amino-2.5-dimethoxydiphenyl | 2'3'-hydroxynaphthoyl-1-amino-4-chlorobenzene | Bluish violet. |
| (2) | ...do... | 2'3'-hydroxynaphthoyl-1-amino-2-methoxybenzene. | Dark violet. |
| (3) | ...do... | 2'3'-hydroxynaphthoyl-2-amino-3-methoxyanthracene. | Vivid violet. |
| (4) | ...do... | 2'3'-hydroxynaphthoyl-4-amino-2.5-dimethoxydiphenyl. | Dark violet. |
| (5) | 4-amino-2.5-diethoxydiphenyl | 2'3'-hydroxynaphthoyl-1-amino-3-nitrobenzene | Reddish violet. |
| (6) | ...do... | 2'3'-hydroxynaphthoyl-1-amino-2.5-dimethoxy-4-chlorobenzene. | Do. |
| (7) | 4-amino-2.5.4'-trimethoxydiphenyl | 2'3'-hydroxynaphthoyl-1-amino-2-methoxybenzene. | Blue. |
| (8) | 4-amino-2.5-dimethoxy-4'-methyldiphenyl | ...do... | Dark violet. |
| (9) | ...do... | 2'3'-hydroxynaphthoyl-1-aminobenzene | Dark blue. |
| (10) | ...do... | 2'3'-hydroxynaphthoyl-1-amino-3-nitrobenzene | Reddish blue. |
| (11) | ...do... | 2'3'-hydroxynaphthoyl-1-amino-4-chlorobenzene | Violetish blue. |
| (12) | 4-amino-2.5-dimethoxy-4'-chlorodiphenyl | ...do... | Blackish violet. |
| (13) | ...do... | 2'3'-hydroxynaphthoyl-1-amino-4-methylbenzene. | Bluish violet. |
| (14) | ...do... | 2'3'-hydroxynaphthoyl-1-amino-2-methoxybenzene. | Do. |
| (15) | ...do... | 2'3'-hydroxynaphthoyl-1-aminobenzene | Dark blue. |
| (16) | ...do... | 2'3'-hydroxynaphthoyl-1-amino-2.4-dimethoxy-3-chlorobenzene. | Reddish violet. |
| (17) | 4-amino-2.5-dimethoxy-4'-phenyldiphenyl | 2'3'-hydroxynaphthoyl-1-amino-3-nitrobenzene | Dark violet. |
| (18) | 4-amino-2.5-dimethoxy-4'-benzoylaminodiphenyl | 2'3'-hydroxynaphthoyl-1-amino-2-methyl-4-chlorobenzene. | Violet. |
| (19) | 4-amino-2.5-dimethoxy-2'-chlorodiphenyl | 2'3'-hydroxynaphthoyl-2-aminonaphthalene | Bordeaux. |
| (20) | ...do... | 2'3'-hydroxynaphthoyl-1-amino-2.5-dimethoxybenzene. | Do. |
| (21) | 4-amino-2.5-dimethoxy-3'-chlorodiphenyl | 2'3'-hydroxynaphthoyl-1-amino-2-methyl-4-methoxybenzene. | Violet. |
| (22) | ...do... | 2'3'-hydroxynaphthoyl-1-aminobenzene | Bluish violet. |
| (23) | 4-amino-2.5-dibutoxy-3'-chlorodiphenyl | 2'3'-hydroxynaphthoyl-1-amino-2-methoxybenzene. | Currant. |
| (24) | 4-amino-2.5-dimethoxy-2'-methyldiphenyl | 2'3'-hydroxynaphthoyl-1-amino-2.4-dimethoxy-5-chlorobenzene. | Bordeaux. |
| (25) | 4-amino-2.5-diethoxy-3'-methyldiphenyl | 2'3'-hydroxynaphthoyl-2-aminonaphthalene | Dark violet. |
| (26) | 4-amino-2.5-dibutoxy-3'-methyldiphenyl | 2'3'-hydroxynaphthoyl-1-amino-2-methyl-4-methoxybenzene. | Currant. |
| (27) | 4-amino-2.5-dimethoxy-3'-methylsulfonyldiphenyl | 2'3'-hydroxynaphthoyl-1-amino-2.5-dimethoxybenzene. | Vivid reddish violet. |
| (28) | ...do... | 2'3'-hydroxynaphthoyl-1-aminonaphthalene | Violet. |
| (29) | 4-amino-2.5-dimethoxy-3'-(ω-trifluor-methyl)diphenyl | 2'3'-hydroxynaphthoyl-1-amino-2.5-dimethoxybenzene. | Bordeaux. |
| (30) | 4-amino-2.5-dimethoxy-3'4'-dichlorodiphenyl | 2'3'-hydroxynaphthoyl-1-aminonaphthalene | Violetish blue. |
| (31) | 4-amino-2.5-dimethoxy-2'4'-dichlorodiphenyl | 2'3'-hydroxynaphthoyl-1-amino-2.5-dimethoxybenzene. | Bordeaux. |
| (32) | 4-amino-2.5-dimethoxy-2'5'-dichlorodiphenyl | 2'3'-hydroxynaphthoyl-1-amino-2-methyl-4-chlorobenzene. | Reddish violet. |
| (33) | 4-amino-2.5.4'-trimethoxy-3'-chlorodiphenyl | 2'3'-hydroxynaphthoyl-1-amino-2-ethoxybenzene | Violet. |
| (34) | 4-amino-2.5-dimethoxy-2'-methyl-5'-chlorodiphenyl | 2'3'-hydroxynaphthoyl-1-amino-3-nitrobenzene | Do. |
| (35) | 4-amino-2.5-dimethoxy-2'4'5'-trichlorodiphenyl | 2'3'-hydroxynaphthoyl-1-amino-2-methyl-4-methoxybenzene. | Bluish Bordeaux. |

Since an object of the present invention is to provide dyestuffs of good fastness properties, which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid, the carboxylic acid and the hydroxy group.

We claim:

1. The water-insoluble azo-dyestuffs of the following general formula:

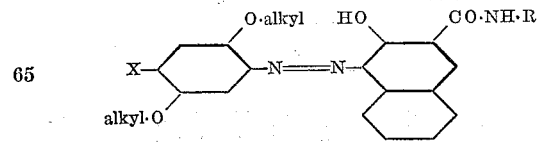

wherein X stands for a radical of the benzene series and R for a radical of the aromatic series, yielding when produced on the fiber, dyeings the shades of which vary from Bordeaux to violet to blue and being distinguished by their good fastness properties, particularly by their good fastness to light.

2. The water-insoluble azo-dyestuffs of the following general formula:

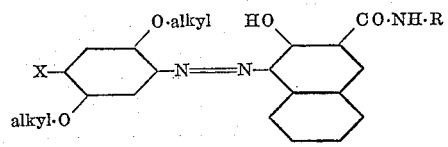

wherein X and R stand for radicals of the benzene series, yielding, when produced on the fiber, dyeings the shades of which vary from Bordeaux to violet to blue and being distinguished by their good fastness properties, particularly by their good fastness to light.

3. The water-insoluble azo-dyestuffs of the following general formula:

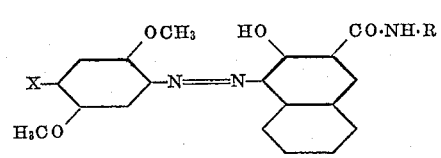

wherein X and R stand for radicals of the benzene series, yielding, when produced on the fiber, dyeings the shades of which vary from Bordeaux to violet to blue and being distinguished by their good fastness properties, particularly by their good fastness to light.

4. The water-insoluble azo-dyestuffs of the following general formula:

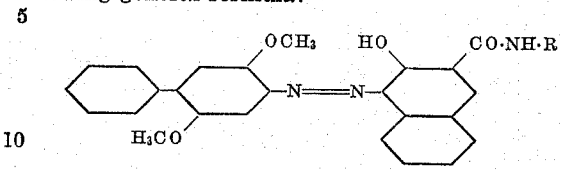

wherein R stands for a radical of the benzene series, yielding, when produced on the fiber, dyeings the shades of which vary from Bordeaux to violet to blue and being distinguished by their good fastness properties, particularly by their good fastness to light.

5. The water-insoluble azo-dyestuff of the following formula:

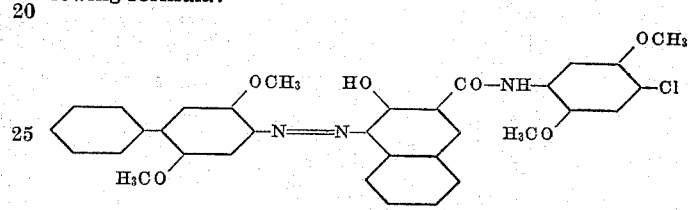

yielding, when produced on the fiber, a vivid, clear violet shade of good fastness properties, particularly of a good fastness to light.

6. Fiber dyed with the azo-dyestuffs as claimed in claim 1.

7. Fiber dyed with the azo-dyestuffs as claimed in claim 2.

8. Fiber dyed with the azo-dyestuffs as claimed in claim 3.

9. Fiber dyed with the azo-dyestuffs as claimed in claim 4.

10. Fiber dyed with the azo-dyestuff as claimed in claim 5.

KARL ZAHN.
KURT SCHIMMELSCHMIDT.